(12) United States Patent
Rosen

(10) Patent No.: US 12,455,251 B2
(45) Date of Patent: Oct. 28, 2025

(54) PIG INCLUDING AN X-RAY FLUORESCENCE SENSOR

(71) Applicant: ROSEN SWISS AG, Stans (CH)

(72) Inventor: Patrik Rosen, Meppen (DE)

(73) Assignee: Rosen IP AG, Stans (CH)

( * ) Notice: Subject to any disclaimer, the term of this patent is extended or adjusted under 35 U.S.C. 154(b) by 924 days.

(21) Appl. No.: 17/613,422

(22) PCT Filed: May 20, 2020

(86) PCT No.: PCT/EP2020/064187
§ 371 (c)(1),
(2) Date: Jun. 6, 2022

(87) PCT Pub. No.: WO2020/234412
PCT Pub. Date: Nov. 26, 2020

(65) Prior Publication Data
US 2022/0317070 A1 Oct. 6, 2022

(30) Foreign Application Priority Data

May 20, 2019 (DE) .......................... 102019113383.1

(51) Int. Cl.
| | |
|---|---|
| *G01N 23/223* | (2006.01) |
| *B08B 9/055* | (2006.01) |
| *F16L 55/32* | (2006.01) |
| *F16L 55/38* | (2006.01) |
| *F16L 55/48* | (2006.01) |
| *F16L 101/12* | (2006.01) |
| *F16L 101/30* | (2006.01) |

(52) U.S. Cl.
CPC ......... *G01N 23/223* (2013.01); *B08B 9/0551* (2013.01); *B08B 9/0557* (2013.01); *F16L 55/32* (2013.01); *F16L 55/38* (2013.01); *F16L 55/48* (2013.01); *F16L 2101/12* (2013.01); *F16L 2101/30* (2013.01); *G01N 2223/3303* (2013.01)

(58) Field of Classification Search
CPC ......... G01N 23/223; G01N 2223/3303; G01N 2223/628; B08B 9/0551; B08B 9/0557; F16L 55/48; F16L 55/38; F16L 55/32; F16L 2101/12; F16L 2101/30; F16J 15/46
See application file for complete search history.

(56) References Cited

U.S. PATENT DOCUMENTS

| | | | | |
|---|---|---|---|---|
| 8,281,444 B2 * | 10/2012 | Rosen | ................... | B08B 9/0558 |
| | | | | 134/8 |
| 8,468,884 B2 * | 6/2013 | Harvey | ................... | F16L 55/38 |
| | | | | 73/221 |
| 12,163,591 B2 * | 12/2024 | Rosen | ................... | B08B 9/0557 |
| 12,320,461 B2 * | 6/2025 | Grote | ........................ | F03B 3/04 |

(Continued)

FOREIGN PATENT DOCUMENTS

| | | |
|---|---|---|
| CN | 105822868 B | 10/2017 |
| DE | 102014101368 A1 | 8/2015 |

*Primary Examiner* — Octavia Hollington
(74) *Attorney, Agent, or Firm* — Husch Blackwell LLP

(57) ABSTRACT

A pig for use in a pipeline is provided for determining the material of the pipeline in the context of an inline inspection. The pig includes a position determination unit and at least one braking arrangement for immobilizing the pig at a certain position in the pipeline. The pig also includes an X-ray fluorescence sensor.

10 Claims, 1 Drawing Sheet

(56) References Cited

U.S. PATENT DOCUMENTS

| | | | |
|---|---|---|---|
| 2011/0235057 A1* | 9/2011 | Storksen | G01B 11/0625 |
| | | | 356/630 |
| 2014/0078499 A1 | 3/2014 | Tunheim et al. | |
| 2016/0136700 A1* | 5/2016 | Schaller | F16L 55/32 |
| | | | 15/104.14 |
| 2018/0036778 A1 | 2/2018 | Punpruk et al. | |
| 2019/0072224 A1 | 3/2019 | Acker et al. | |
| 2022/0074822 A1* | 3/2022 | Al-Rwaily | G01N 1/04 |
| 2022/0214001 A1* | 7/2022 | Rosen | G01S 11/14 |

* cited by examiner

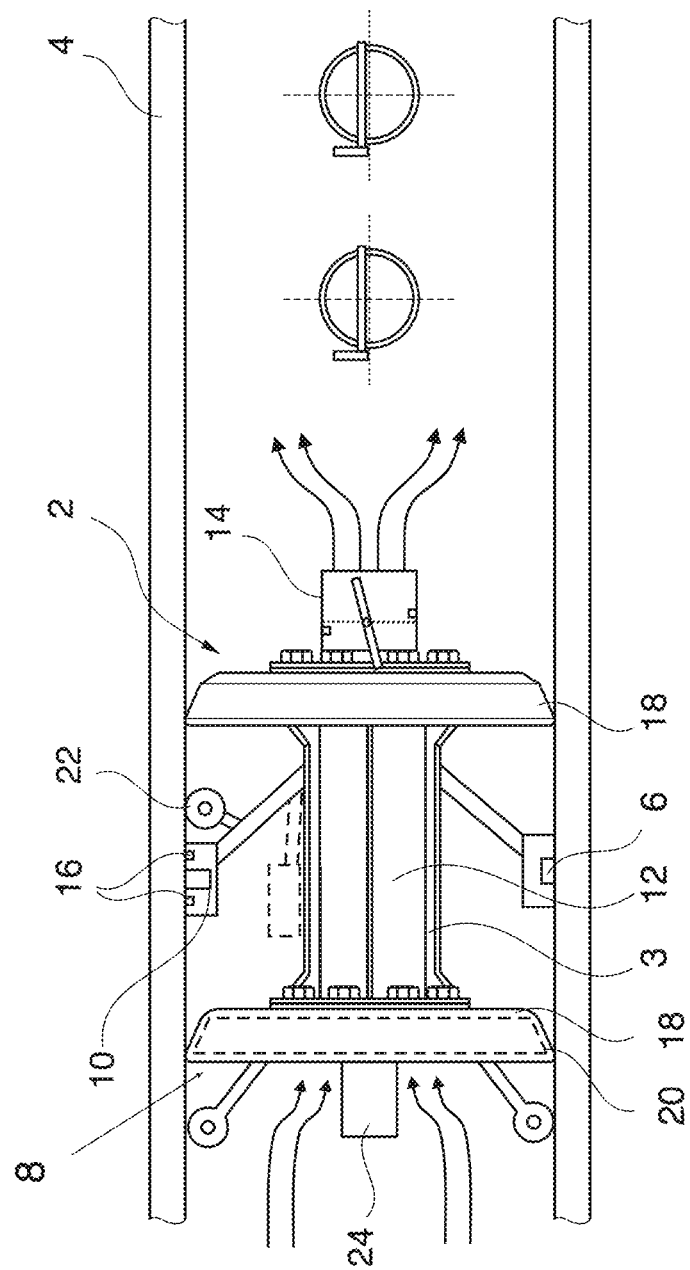

PIG INCLUDING AN X-RAY FLUORESCENCE SENSOR

CROSS REFERENCE

This application claims priority to PCT Application No. PCT/EP2020/064187, filed May 20, 2020, which itself claims priority German Patent Application No. 10 2019 113383.1, filed May 20, 2019, the entirety of both of which are hereby incorporated by reference.

FIELD OF THE INVENTION

The invention relates to a pig for use in a pipeline for determining the material of the pipeline in the context of an inline inspection. The pig comprises a position determination unit, via which the position of the pig in the pipeline can be determined, and at least one braking arrangement for immobilizing the pig in a certain position in a pipeline as well as an X-ray fluorescence sensor and/or an atomic emission spectroscopy arrangement (AES arrangement), in particular for performing laser-induced plasma spectroscopy (LIBS).

BACKGROUND OF THE INVENTION

Via an X-ray fluorescence sensor and/or an AES arrangement, the material of a pipeline or of a section of a pipeline can be determined. Via an X-ray fluorescence analysis and/or by means of atomic emission spectroscopy, it can thus be checked which steel was used in a section of a pipeline, in particular in a pipeline. This is of interest not only for old pipelines, but also for new pipelines. A check is performed to determine whether the documentation is correct and whether the pipeline installation can be approved. In particular, this is interesting for pipelines which transport natural gas and/or petroleum or petroleum products.

X-ray fluorescence analysis and/or atomic emission spectroscopy is/are time consuming in comparison to typical inline inspection methods for pipelines. The sensor and/or the AES arrangement must remain at least for a few seconds at the same site of a pipeline. In conventional inline inspection pigs this is not possible or at best it is possible at great expense.

BRIEF SUMMARY OF THE INVENTION

For this purpose, a pig according to the invention comprises at least one position determination unit, by means of which the position of the pig in the pipeline can be determined, and at least one braking arrangement for immobilizing the pig at a certain position in the pipeline. A pig according to the invention can thus be stopped in a certain position in the pipeline. Thus, an X-ray fluorescence analysis and/or atomic emission spectroscopy can be performed.

A pig according to the invention moreover includes the devices necessary for operation, such as control electronics, via which the electronic components arranged on the pig can be actuated, a data memory for at least temporarily storing measurement data of the X-ray fluorescence sensor and/or of the AES arrangement, as well as means for outputting and/or exchanging data. Furthermore, the pig can include an evaluation unit for evaluating sensor data, in particular data of the position determination unit. The pig thus has the usual components of electronic data processing such as a memory and a central computer unit. Furthermore, the pig has an energy storage, via which electrical energy is made available to the electrical and/or electronic components of the pig.

Preferably, the position determination unit includes an odometer, a weld seam detection arrangement and/or a signal receiver for positioning signals transmitted through the pipeline wall. With an odometer, the position can be determined as a function of the distance traveled. With a weld seam detection arrangement, the weld seams can be detected and optionally counted. The weld seams to be detected are weld seams arranged circumferentially in the pipeline wall, by means of which individual sections of a pipeline are assembled. Thus, after each of these detected weld seams, a new pipeline section starts. In the documentation of a pipeline, in particular of a pipeline for oil or gas transport, the individual sections with their length and also the position of the weld seams are known. Thus, via a weld seam detection arrangement, a pig according to the invention can be stopped after each new circumferential weld seam, and thus, in each pipeline section, one or more X-ray fluorescence analyses and/or atomic emission spectroscopy analyses can be performed. The position determination unit can also include a signal receiver for positioning signals transmitted through the pipeline wall. These signals can be introduced by reference transmitters attached outside on the pipeline. On the basis of the signal introduced by the reference transmitter, the pig can determine its position in the pipeline. On the other hand, the positioning signal can also include a command for stopping the pig. Thereby, the pig is stopped if the corresponding signal can be received with sufficient intensity or a corresponding signal is transmitted at a certain time into the pipeline or through the pipeline wall. Thereby, the position determination of the pig according to the invention can reliably occur.

Preferably, the pig comprises a cleaning arrangement for cleaning a section of the pipeline wall to be analyzed by means of the X-ray fluorescence sensor and/or the AES arrangement. Here, the pipeline wall is freed of deposits or rust. An analysis of the material composition is thus not affected by such contaminants of the pipeline. The cleaning arrangement can include, for example, a rotating wire brush which is guided over the section of the pipeline wall to be analyzed.

Preferably, the pig comprises a drive unit for positioning the pig within the pipeline. Usually, a pig is moved through the pipeline by the medium flowing in the pipeline. The use of a drive unit enables the positioning of the pig independently of the flow of the fluid in the pipeline. By using a drive unit, the positionability the pig in the pipeline is thus improved. It is possible to approach sections of the pipeline wall to be analyzed in a targeted manner.

Preferably, the pig comprises a bypass system with a bypass valve through which a fluid flowing in the pipeline can be led past the pig or through the pig. By means of such a bypass system, the forces to be applied by the braking arrangement and which act on the pipeline are reduced. The fluid flowing through the pipeline can pass through the immobilized pig. It is therefore not necessary to stop the flow of the fluid flowing in the pipeline during the measurement. A reduction of the flow speed or of the pressure in the pipeline is sufficient. Where appropriate, an adaptation of the flow in the pipeline can also be entirely dispensed with. Moreover, a bypass system with a bypass valve can also be used for positioning the pig within the pipeline. Thus, the pig with closed bypass valve or closed bypass system can be transported by the fluid flowing in the pipeline into the vicinity of the pipeline section to be examined. Subsequently, the bypass valve is opened, so that a portion of the fluid flowing in the pipeline can flow past the pig or through the pig. The pig can be immobilized by the braking arrangement. After the measurement, the braking arrangement can release the pig again, whereafter the pig is transported further by the fluid flow in the pipeline. This can be reinforced by an at least partial closing of the bypass valve.

Particularly preferably, the bypass valve is formed so that a fluid flowing in the pipeline acts on the bypass valve with a force which moves the bypass valve in the direction of a closed position. The bypass valve is moved by a motor. By means of the aforementioned design, it is ensured that the bypass valve is switched by the action of the fluid flowing in the pipeline into a closed position if the motor fails and/or if the pig no longer has energy. The pig is discharged from the pipeline by the fluid.

Particularly preferably, the bypass valve can pivot about a pivot axis, wherein the bypass valve is designed as asymmetrical about the pivot axis. The bypass valve is arranged on the pig so that the section of the bypass valve with larger surface area can be acted upon by a fluid flowing in the pipeline with a force which moves the bypass valve in the direction of the closed position. This is a particularly simple design of a bypass valve which automatically closes under the action of the fluid flowing in the pipeline. By means of such a bypass valve, it can be ensured that the pig is also discharged from the pipeline in the case of malfunctions.

Advantageously, the pig comprises an energy converter which is configured to convert the kinetic energy of the fluid flowing in the pipeline into electrical energy. Thereby, electrical energy can be obtained for the operation of the pig while the pig is in the pipeline. Such an energy converter can include a generator unit which is connected to a propeller, wherein the propeller is configured to be set in rotation by the fluid flowing in the pipeline. Such an energy converter is particularly advantageous for a pig with an X-ray fluorescence sensor and/or an AES arrangement, since, in comparison to conventional inspection pigs, such a pig remains in a pipeline for a long time and has to be decelerated and accelerated repeatedly, and since an X-ray fluorescence sensor and/or an AES arrangement has/have an energy consumption which is increased in comparison to the measurement sensors conventionally used in inline inspection.

Preferably, the pig comprises multiple X-ray fluorescence sensors and/or AES arrangements for simultaneous determination of the pipeline composition at multiple sites. By the measurement at multiple sites of the pipeline, the detection of the material used in the corresponding pipeline section becomes more reliable. The X-ray fluorescence measurements and/or AES measurements, in particular in the form of LIBS measurements, can be distorted by contaminants or deposits. The result is improved by the determination at multiple sites.

Preferably, a proximity sensor is arranged on the X-ray fluorescence sensor, wherein the proximity sensor is configured to prevent switching on of the X-ray fluorescence sensor if the proximity sensor is not in contact with the pipeline wall. An X-ray fluorescence sensor irradiates the section of a material specimen to be examined with shortwave X-ray radiation. A proximity sensor arranged on the X-ray fluorescence sensor ensures that the X-ray radiation is not transmitted inadvertently into a pipeline during the transport or during the introduction of a corresponding pig, endangering personnel. Particularly preferably, at least two proximity sensors are arranged in an X-ray fluorescence sensor. The proximity sensors are here configured so that a switching on of the X-ray fluorescence sensor is prevented as long as the proximity sensors are not all in contact with a pipeline wall. By the use of multiple proximity sensors, the safety with regard to inadvertent switching on of the X-ray fluorescence sensor is increased.

Preferably, the pig has at least one first sealing element arranged adjacent to a first end of the pig body and at least one second sealing element arranged adjacent to a second end of the pig body. The sealing elements are spaced apart from one another and can be brought in contact with a pipeline inner wall of the pipeline. The X-ray fluorescence sensor is arranged between the first and second sealing elements. Thereby, a space can be provided between the two sealing elements, in which conditions necessary for the use of an X-ray fluorescence sensor prevail. In particular, if a pipeline filled with petroleum and/or petroleum products is used, it can be necessary to provide a special closed space in which an X-ray fluorescence sensor and/or an AES arrangement can work. For example, it can be necessary to free the pipeline wall of a film of oil, in order to be able to perform a reliable measurement.

Particularly preferably, the sealing element is elastic and comprises an annular cavity which can be filled with a fluid and via which the sealing element can be acted upon by a force which moves the sealing element outward in radial direction. The annular cavity can here be formed by the sealing element itself. However, the sealing element can also comprise an annular elastic hollow body which forms the annular cavity. A correspondingly formed sealing element can thus be brought in contact with a pipeline wall by filling the cavity with a fluid or the force applied by the sealing element to the pipeline wall can be increased. Such a sealing element can, for example, also be part of the braking arrangement, wherein a deceleration occurs by pressing the sealing element against the pipeline inner wall. By using several such sealing elements, the friction forces can be further increased.

Such a pig can comprise means for pumping dry the region between the first and second sealing elements, in order to improve the conditions for the inspection of the pipeline there. Here, the internal pressure in the pipeline or the pressure differential, via the bypass of the repair pig arranged in the pipeline, can be used to promote the pumping dry. In particular, for this purpose, a Venturi nozzle can be used in the bypass.

Furthermore, particularly preferably, the pig comprises a container with a flushing fluid, in particular a pressurized gas, by means of which the region between the first and second sealing elements can be flushed. For this purpose, the pig comprises at least one flushing valve which is arranged in the pig body and/or in at least one of the sealing elements. Any medium located between the first and second sealing elements is here at least partially driven out of this space. The flushing fluid is here selected so that the X-ray fluorescence sensor performs particularly reliable measurements in the flushing fluid.

Moreover, the invention relates to a method for inline inspection of a pipeline for determining the material composition of the pipeline in which a pig with an X-ray fluorescence sensor and/or an AES arrangement is introduced into a pipeline, the pig is passed through the pipeline and decelerated in the pipeline, in particular stopped. Then, an X-ray fluorescence measurement and/or an AES measurement is/are performed on the inner side of the pipeline. Thus, the composition of the pipeline inner wall can be determined without the pipeline having to be made accessible from the outside.

Preferably, the method includes the performance of multiple measurements in a pipeline, in particular in each new pipeline section. The pig is transported further through the pipeline and stopped at another site within the pipeline, where an additional measurement is performed. These method steps are optionally repeated multiple times. Thereby, large sections of a pipeline or the entire pipeline can be examined by means of a corresponding pig. The inspection work can thus be performed in the interior of the pipeline and it is not necessary to have the pipeline be examined outside by individual walking along it.

Preferably, a section to be analyzed by means of the X-ray fluorescence sensor and/or the AES arrangement is cleaned before a measurement is performed. Thereby, deposits or contaminants on the surface of the pipeline inner wall, which can distort the measurement, are removed. The cleaning can occur, for example, by means of a cleaning arrangement including, for example, brushes, which is attached on the pig. However, the cleaning can also occur by means of a cleaning pig which is sent through the pipeline ahead of the pig with the X-ray fluorescence sensor and/or the AES arrangement.

Preferably, in the method, a fluid flowing in the pipeline is led through a bypass of the pig. Thus, in a pipeline to be examined, while the method is carried out, the fluid can still be transported while the pig is immobile is in place. The operation of the pipeline can still be maintained or only partially limited. Thereby, the costs for carrying out the method are reduced.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 1 shows a pig according to the invention.

DETAILED DESCRIPTION OF THE DRAWINGS

Individual features of the embodiment example described below, in combination with the features of the independent claims, can also lead to developments according to the invention.

FIG. 1 shows a pig 2 in a pipeline 4. On the pig 2, an X-ray fluorescence sensor 10 is arranged. In the present embodiment example, the X-ray fluorescence sensor 10 is secured on a pivotable arm which can be brought from a transport position represented with dashed lines, where it is in contact with a pig body 3 of the pig, and to a measurement position in which the X-ray fluorescence sensor 10 is in contact with the pipeline 4. Adjacent to the X-ray fluorescence sensor 10, two proximity sensors 16 are arranged. These sensors 10, 16 are introduced together into a sensor accommodation. In a measurement position, the proximity sensors 16 are in contact with the pipeline 4. The proximity sensors 16 are here designed so that the X-ray fluorescence sensor 10 with the source of energy-rich X-ray radiation present there can only be activated if the proximity sensors 16 are in contact with a measurement object, in the present case the pipeline 4. In the embodiment example, a cleaning arrangement 22 is arranged on the pivotable arrangement. In the present case, said cleaning arrangement is formed as a brush which can be set in rotation by a drive. The brush can here be designed as a wire brush with steel bristles or polymer bristles. However, the cleaning arrangement 22 can also be implemented with other alternative cleaning means. Here, this can involve nozzles which apply cleaning fluid onto the section to be examined and/or which clear the section using a stream of gas. Devices which wipe off or vacuum the section are also conceivable. The cleaning arrangement 22 is used to free a section of the pipeline 4, in where a measurement by the X-ray fluorescence sensor 10 should take place, of deposits and/or contaminants.

In the embodiment example, the pig 2 comprises a position determination unit 6, which is designed in the form of a weld seam detector. The weld seam detector detects circumferential weld seams by means of which individual sections of a pipeline are connected. Thus, for the complete analysis of the respective steel qualities used in a section, after each detection of a circumferential weld seam by means of the position determination unit 6, the pig 2 can initiate a measurement by the X-ray fluorescence sensor 10. Thus, while traveling through the pipeline, each segment, one after the other, is analyzed at least once, and the steel quality used there is determined. It is also conceivable to perform, in each section, multiple measurements which are performed in sections that are spaced apart from one another. Instead or also additionally, a position determination unit 6 can also comprise an odometer and/or a sensor for the signals sent through the pipeline 4.

In the embodiment example according to FIG. 1, the pig must be capable of stopping in the pipeline. Thereby, the X-ray fluorescence sensor 10 is enabled to perform a measurement on a certain section of the pipeline 4. The measurement by means of the X-ray fluorescence sensor 10 has an increased measurement duration, during which the X-ray fluorescence sensor 10 must remain at a site of the pipeline to be analyzed. For this purpose, the pig comprises a bypass system 12 with a bypass valve 14. The pig body 3 comprises one or more continuous cavities 4 extending in longitudinal direction through the pig body 3, by means of which the fluid located in the pipeline 4 can flow through the pig body 3. This cavity or these cavities can be closed via a bypass valve 14. The bypass valve 14 closes the cavities, while the pig 2 is to be transported through the pipeline. When the pig 2 has reached a new section of the pipeline 4 approaches a new position where a measurement by means of the X-ray fluorescence sensor 10 is to occur, the bypass valve 14 is opened. The bypass valve 14 is here predominantly implemented with a circular cross section and pivotable about a pivot axis, wherein the pivot axis is arranged asymmetrically on the valve body of the bypass valve 14. Thereby, it is achieved that the bypass valve 14 automatically closes under the action of a fluid flowing in the pipeline 4. In the normal case, the bypass valve 14 is opened and closed by motor. In the case of a failure of the drive of the bypass valve 14, the bypass valve 14 is brought into a closed position by the fluid flowing in the pipeline 4, and the pig 2 is discharged from the pipeline.

For the immobilization, the pig 2 moreover comprises a braking arrangement 8. In the present embodiment example, said braking arrangement includes a sealing element 18 which comprises an annular cavity 20. In addition, the braking arrangement 8 includes a hydraulic pump, by means of which the annular cavity 20 of the sealing element 18 can be filled with a fluid. Thereby, the sealing element 18 is brought in contact with the pipeline 4 and/or the pressure which the sealing element 18 exerts on the pipeline 4 is adjusted. The pig 2 is thus braked in the pipeline 4 and immobilized at a site where the X-ray fluorescence sensor 10 can perform a measurement. Alternative embodiments of the sealing element are conceivable. However, a braking arrangement 8 can also include movable braking elements which can be brought in contact with the pipeline 4 and/or which include drive elements by which the pig 2 is transported through the pipeline 4. Said dive elements can be fluid drives such as propellers, impellers or jet drives or wheels or crawler tracks in contact with the pipeline 4. They can move the pig 2 through the pipeline 4 but also can stop said pig at a certain site in the pipeline. For this purpose, the wheels or crawler tracks can comprise brakes.

Alternatively or in addition to the X-ray fluorescence sensor 10, the pig 2 can also comprise an AES arrangement for performing atomic emission spectroscopy, in particular a LIBS arrangement for performing laser-induced plasma spectroscopy.

The invention claimed is:

1. A pig for use in a pipeline for determining the material of the pipeline in the context of an inline inspection, the pig comprising:
   a position determination unit;
   at least one braking arrangement for immobilizing the pig at a certain position in the pipeline;
   an X-ray fluorescence sensor and/or an atomic emission spectroscopy arrangement (AES arrangement); and
   a bypass system with a bypass valve through which a fluid flowing in the pipeline is led past the pig and/or through the pig,
   wherein the bypass valve is pivotable about a pivot axis, wherein the bypass valve is asymmetrical about the pivot axis and is arranged on the pig so that the part of the bypass valve with a larger surface area can be acted upon by a fluid flowing in the pipeline with a force which moves the bypass valve in the direction of the closed position.

2. The pig according to claim 1, wherein the position determination unit includes at least one of an odometer, a weld seam detection arrangement, and a signal receiver for positioning signals transmitted through the pipeline wall.

3. The pig according to claim 1, further including:
   a cleaning arrangement for cleaning a section of the pipeline wall to be analyzed by the X-ray fluorescence sensor and/or the atomic emission spectroscopy arrangement (AES arrangement).

4. The pig according to claim 1, further including:
   a drive unit for positioning the pig within the pipeline.

5. The pig according to claim 1, wherein the bypass valve is formed in such a manner that a fluid flowing in the pipeline acts on the bypass valve with a force which moves the bypass valve in the direction of a closed position.

6. The pig according to claim 1, wherein the pig comprises multiple X-ray fluorescence sensors for simultaneously determining the pipeline composition at multiple sites.

7. The pig according to claim 1, wherein, on the X-ray fluorescence sensor, a proximity sensor is arranged, wherein the proximity sensor is configured to prevent the switching on of the X-ray fluorescence sensor if the proximity sensor is not in contact with a pipeline wall.

8. The pig according to claim 7, wherein on the X-ray fluorescence sensor, at least two proximity sensors are arranged, which are configured to prevent the switching on of the X-ray fluorescence sensor as long as the proximity sensors are not all in contact with a pipeline wall.

9. The pig according to claim 1, wherein, on the pig body, at least one first sealing element arranged adjacent to a first end of the pig body and at least one second sealing element arranged adjacent to a second end of the pig body are arranged, which sealing elements are spaced apart from one another and can be brought in contact with a pipeline inner wall, and the X-ray fluorescence sensor and/or the atomic emission spectroscopy arrangement (AES arrangement) is/are arranged between the first and second sealing elements.

10. The pig according to claim 9, wherein a sealing element comprises an annular cavity which can be filled with a fluid, and via which the sealing element can be acted upon by a force which moves the sealing element in radial direction outward.

\* \* \* \* \*